United States Patent
Kovac

(10) Patent No.: US 7,429,150 B2
(45) Date of Patent: Sep. 30, 2008

(54) TOOL HOLDER WITH SPHERICAL CONTACT POINTS

(75) Inventor: Jeffrey F. Kovac, Loyalhanna, PA (US)

(73) Assignee: Kennametal Inc., Latrobe, PA (US)

( * ) Notice: Subject to any disclaimer, the term of this patent is extended or adjusted under 35 U.S.C. 154(b) by 156 days.

(21) Appl. No.: 11/444,677

(22) Filed: May 31, 2006

(65) Prior Publication Data
US 2007/0280790 A1    Dec. 6, 2007

(51) Int. Cl.
*B23B 27/16* (2006.01)

(52) U.S. Cl. .................. 407/66; 407/30; 407/103; 407/113

(58) Field of Classification Search .......... 407/30, 407/43, 67, 68, 103, 69, 66, 70, 82, 87, 96, 407/113, 117
See application file for complete search history.

(56) References Cited

U.S. PATENT DOCUMENTS

| | | | |
|---|---|---|---|
| 3,946,475 A | 3/1976 | Hopkins | |
| 4,215,957 A | 8/1980 | Holma et al. | |
| 4,449,027 A * | 5/1984 | Fujikawa | 219/69.15 |
| 4,509,886 A * | 4/1985 | Lindsay | 407/102 |
| 4,876,932 A * | 10/1989 | Nessel | 82/158 |
| 5,658,101 A * | 8/1997 | Hammer | 407/37 |
| 6,126,366 A * | 10/2000 | Lundblad | 407/102 |
| 6,149,355 A * | 11/2000 | Fouquer et al. | 407/113 |
| 6,152,658 A * | 11/2000 | Satran et al. | 407/103 |
| 6,234,724 B1 * | 5/2001 | Satran et al. | 407/43 |
| 6,413,021 B1 * | 7/2002 | Koch et al. | 407/43 |
| 6,481,936 B1 | 11/2002 | Hecht | |
| 6,607,334 B2 | 8/2003 | Satran et al. | |
| 6,659,694 B1 | 12/2003 | Asbell et al. | |
| 6,709,205 B2 * | 3/2004 | Morgulis et al. | 407/113 |
| 7,121,771 B2 * | 10/2006 | Englund | 407/103 |
| 2003/0113175 A1 | 6/2003 | Wermesiter | |

* cited by examiner

*Primary Examiner*—Willmon Fridie
(74) *Attorney, Agent, or Firm*—Larry R. Meenan

(57) ABSTRACT

A tool holder includes a shank portion, a head portion that includes an insert pocket defined by a seat surface, a first or radial support sidewall and a second or axial support sidewall, and a spherical contact point protruding from one of the first and second support sidewalls. The spherical contact point minimizes a contact area between a cutting insert mounted in the insert pocket and one of the first and second support sidewalls of the insert pocket. In one embodiment, the radial support sidewall includes two spherical contact points, and the axial support sidewall includes one spherical contact point. The spherical contact point may be formed by inserting a rivet-like structure into an aperture formed in the support sidewalls of the pocket.

15 Claims, 7 Drawing Sheets

TOOL HOLDER WITH SPHERICAL CONTACT POINTS

BACKGROUND OF THE INVENTION

During manufacturing of a cutting insert, the cutting insert undergoes a sintering process. Unfortunately, surfaces of the cutting insert may become slightly distorted due to the sintering process. A further grinding process may minimize or eliminate these surface distortions, but not all of the surfaces on the insert may be ground because of the extra cost associated with the grinding process.

It is important that the insert be securely seated in the pocket of the tool holder during a machining operation. The distortion on the surfaces of the insert that were introduced during the sintering process may cause the cutting insert to be improperly seated in the pocket of the tool holder. This improper seating could lead to excessive runout of the system.

Several attempts have been made to minimize the contact area between the cutting insert and the pocket of the tool holder. One such attempt is to provide the pocket wall and/or the cutting insert with one or more contact "points" in the form of a pad, land or protrusion having a relatively large planar surface. Although these contact "points" somewhat minimize the contact area between the cutting insert and the pocket, a sufficient amount of contact area still exists between the cutting insert and the pocket that still may prevent the insert from properly seating in the pocket of the tool holder. Thus, there is a need to minimize the effect of distortion on the surfaces of the cutting insert, particularly the flank faces or sidewalls of the cutting insert, so that the cutting insert can be properly seated in the pocket of the tool holder.

BRIEF SUMMARY OF THE INVENTION

Briefly, according to this invention, there is provided tool holder for minimizing a surface area between a cutting insert and support sidewalls of the tool holder. In one embodiment, the tool holder comprises a head portion including an insert pocket defined by a seat surface and at least one support sidewall; and at least one spherical contact point protruding from said at least one support sidewall, wherein the at least one spherical contact point minimizes a contact area between a cutting insert mounted in the insert pocket and the at least one support sidewall of the insert pocket.

In another embodiment, the tool holder comprises a head portion including an insert pocket defined by a seat surface, a radial support sidewall 16b and an axial support sidewall; a first spherical contact point protruding from the radial support sidewall; and a second spherical contact point protruding from the axial support sidewall, wherein the first and second spherical contact points minimize a contact area between a cutting insert mounted in the insert pocket and the radial and axial support sidewalls of the insert pocket.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
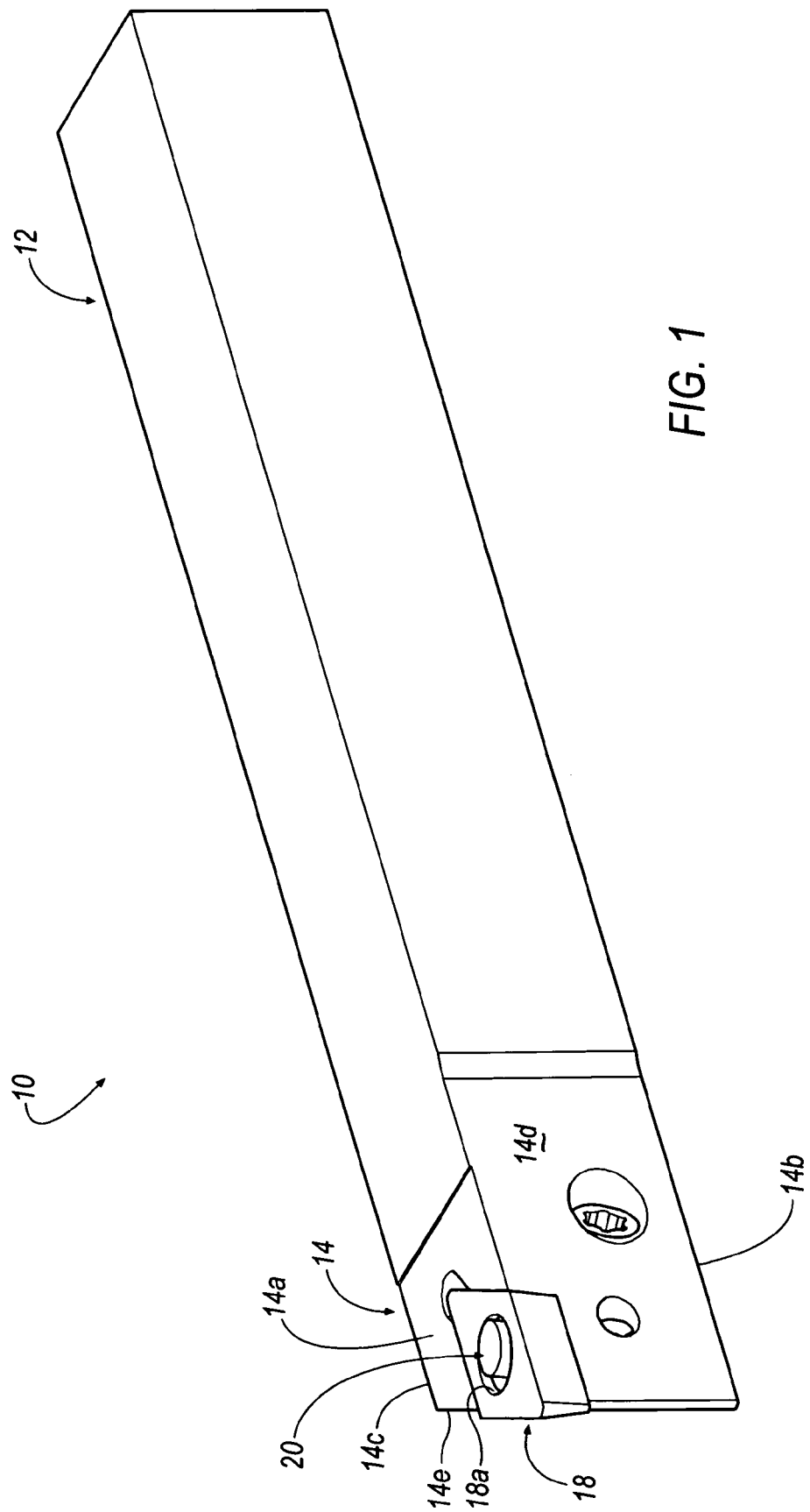
FIG. 1 is a perspective view of a tool holder with spherical contact points according to an embodiment of the invention.
Figure 2:
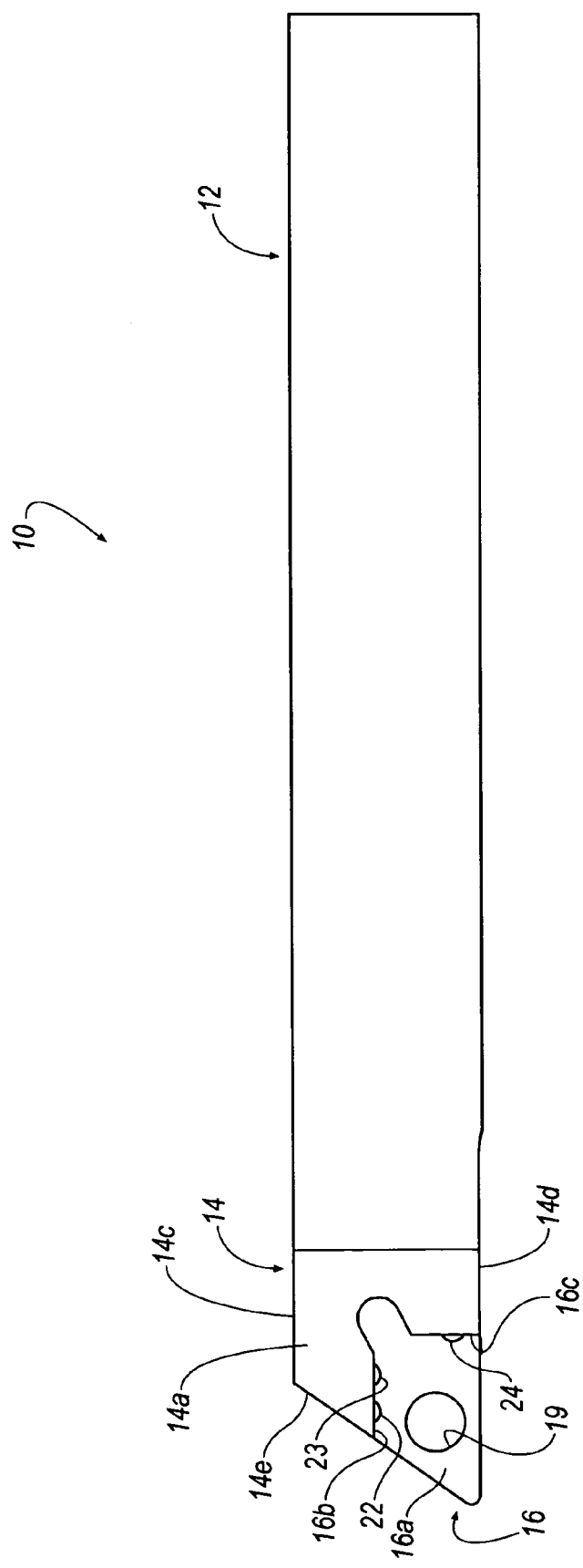
FIG. 2 is a top view of the tool holder of FIG. 1 with the insert and clamp pin removed for clarity.
Figure 3:
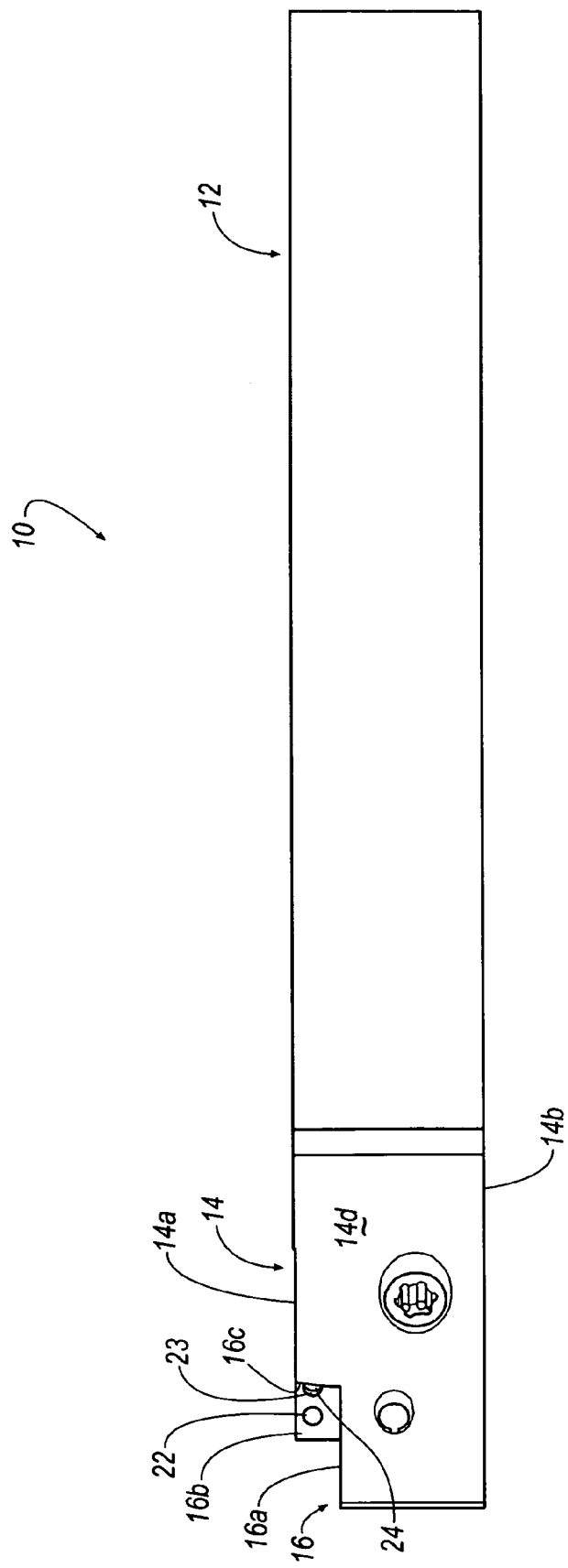
FIG. 3 is a side view of the tool holder of FIG. 1 with the insert and clamp pin removed for clarity.

Referring to the drawings, wherein like reference characters represent like elements, FIGS. 1-3 show a tool holder, shown generally at 10, according to an embodiment of the invention. In the illustrated embodiment, the tool holder 10 comprises a lathe tool that includes a generally rectangular or square-shaped shank portion 12 and a head portion 14 defined by a top surface 14a, a bottom surface 14b, a first side surface 14c, an opposite second side surface 14d, and a third side surface 14e that may be formed at an angle with respect to with respect to the side surfaces 14c, 14d.

Referring now to FIGS. 2 and 3, the head portion 14 has an insert pocket 16 for retaining an insert 18 therein. The insert pocket 16 comprises a base or seat surface 16a, a first or radial support sidewall 16b and a second or axial support sidewall 16c. However, it will be appreciated by those skilled in the art that the invention can be practiced with any tool holder design that includes an insert pocket for retaining an insert therein.

The seat surface 16a is provided with a threaded bore 19 for receiving a clamp screw or pin 20 (FIG. 1), which is received in a through bore 18a in the insert 18 to securely hold the insert 18 in place. It will be appreciated that the invention is not limited by the shape of the bore 19 and the clamp pin 20, and that the invention can be practiced with any desirable corresponding shapes for the bore 19 and the clamp pin 20. For example, the bore 19 and the clamp pin 20 may be oval, rectangular, square, and the like.

In order to minimize the effect of surface distortion of the insert 18 and better define the location of the insert 18 within the insert pocket 16, the first or radial support sidewall 16b includes at least one, and preferably two spherical contact points 22, 23 protruding therefrom, and the second or axial support sidewall 16c includes at least one spherical contact point 24 protruding therefrom. In the illustrated embodiment, it is preferred that the first or radial support sidewall 16b includes two spherical contact points 22, 23 because the first support sidewall 16b provides radial support (substantially parallel to the centerline axis, CL, of the tool holder 10) for the cutting insert 18, which typically experiences a relatively larger amount of force exerted thereon. The second or axial support sidewall 16c includes a single (a lesser number) spherical contact point 24 because the second support sidewall 16c provides axial support (perpendicular to the centerline axis, CL) for the cutting insert 18, which typically experiences a relatively smaller amount of force exerted thereon. Each spherical contact point 22, 23, 24 provide a singular contact point between the insert pocket 16 and the cutting insert 18. Because the contact points 22, 23, 24 are substantially spherical in shape, the contact points 22, 23, 24 provide for minimal contact surface area between the cutting insert 18 and the support sidewalls 16b, 16c, unlike conventional contact points that provide a relatively larger contact surface in the form of a protrusion, a land, a pad, and the like.

In the illustrated embodiment, the insert 18 is held by a three-point contact defined by three spherical contact points 22, 23, 24. However, it will be appreciated that the invention is not limited by the number of spherical contact points located on each of the support sidewalls 16b, 16c, and that the invention can be practiced with any desired number of spherical contact points, depending on the size and/or geometry of the insert 18. For example, it may be desirable to provide three spherical contact points 22 or 23 on the first or radial support sidewall 16b and two spherical contact points 24 on the second or axial support sidewall 16c for a relatively larger cutting insert.

In the illustrated embodiment, each spherical contact point 22, 23, 24 has an outer surface with a rounded shape in the form a sphere, a spheroid, an oblate spheroid, a prolate spheroid, a pseudosphere, and the like. The shape of the outer surface of the spherical contact points 22, 23, 24 may be substantially identical, or alternatively may be different from one another. For example, the outer surface of all the spherical contact points 22, 23, 24 may be substantially round in shape, as shown in the illustrated embodiment. In another example, the outer surface of two spherical contact points 22, 23 protruding from the radial support sidewall 16b may be in the form of a sphere, whereas the outer surface of the spherical contact point 24 protruding from the axial support sidewall 16c may be in the form of an oblate spheroid. In all cases, the outer surface of the contact points 22, 24 is substantially spherical to minimize the amount of contact area between the cutting insert 18 and the support sidewalls 16b, 16c.

By definition, a sphere is an ellipsoid having all three axes of equal length such that the set of all points in three-dimensional Euclidean space that is located at a distance r (the "radius") from a given point (the "center"). Twice the radius is called the diameter, and pairs of points on the sphere on opposite sides of a diameter are called antipodes. Any cross section through a sphere is a circle (or, in the degenerate case where the slicing plane is tangent to the sphere, a point). The size of the circle is maximized when the plane defining the cross section passes through a diameter. A pseudosphere is defined as half the surface of revolution generated by a tractrix about its asymptote to form a tractroid. The surfaces are sometimes also called the antisphere or tractrisoid.

By definition, a spheroid is as an ellipsoid having two axes of equal length. By convention, the two distinct axis lengths are denoted a and c, and the spheroid is oriented so that its axis of rotational symmetric is along the z-axis. An oblate spheroid is defined as a spheroid that is "squashed" instead of "pointy," i.e., one for which the equatorial radius a is greater than the polar radius c, so a>c. A prolate spheroid is defined as a spheroid that is "pointy" instead of "squashed," i.e., one for which the polar radius c is greater than the equatorial radius a, so c>a.

Figure 4:
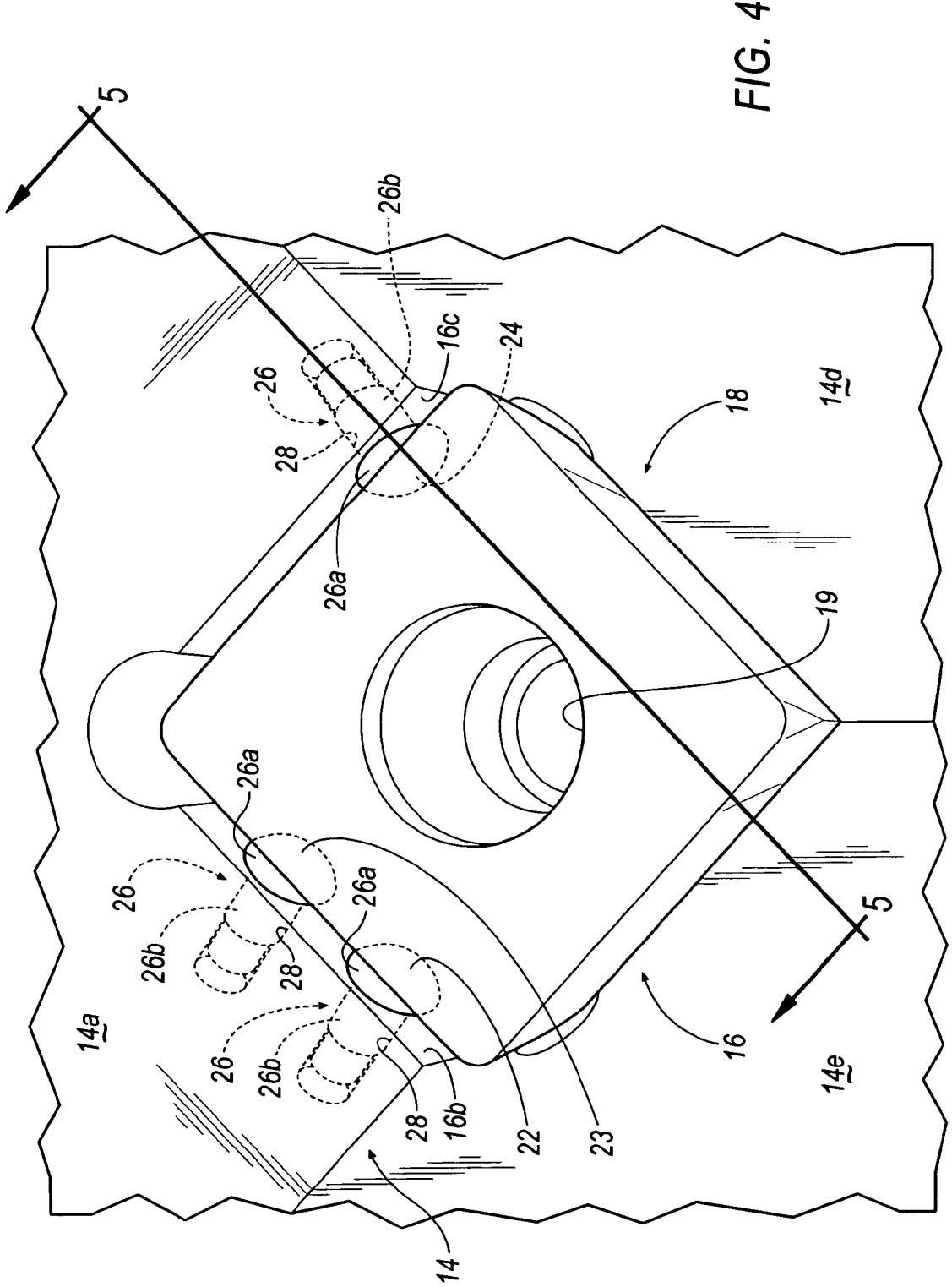
FIG. 4 is an enlarged top view of the pocket and spherical contact points of the tool holder of FIG. 1 according to an embodiment of the invention.
Figure 5:
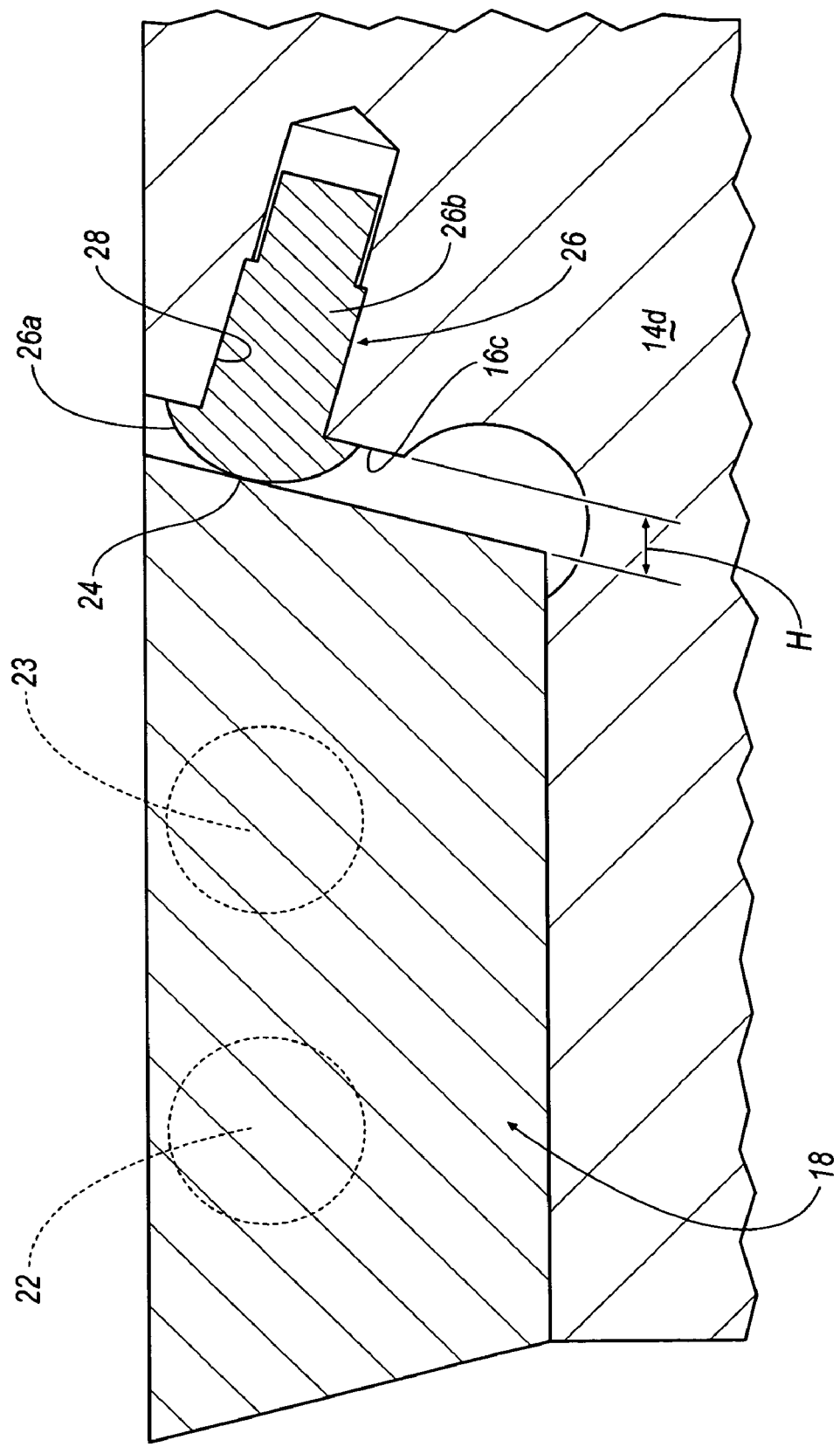
FIG. 5 is a cross-sectional view of the pocket and spherical contact points taken along line 5-5 of FIG. 4.

Referring now to FIGS. 4 and 5, the spherical contact points 22, 23, 24 may be formed by a rivet-like structure, shown generally at 26, having a head portion 26a and a shaft portion 26b. The rivet-like structure 26 may be formed of a material having a hardness that is at least as hard as the material forming the insert pocket 16. For example, the rivet-like structure 26 may be formed of 4340 steel having a Rockwell hardness of 40 or greater.

During assembly of the tool holder 10, the shaft portion 26b is inserted into an opening or aperture 28 formed the support sidewalls 16b, 16c of the insert pocket 16, thereby exposing the head portion 26a that protrudes from the support sidewalls 16b, 16c to provide the spherical contact points 22, 23, 24. The aperture 28 is substantially perpendicular to the first and second support sidewalls 16b, 16c. Other ways of providing the spherical contact points 22, 23, 24 are contemplated by the inventors and are within the scope of the invention. For example, each spherical contact point 22, 23, 24 may be integrally formed with the first and second support sidewalls 16b, 16c of the tool holder 10.

In the illustrated embodiment shown in FIG. 5, the head portion 26a of the rivet-like structure 26 is in the form of a sphere having a height, H, in the range between about 0.001 inches and about 0.050 inches, and preferably in the range between about 0.005 inches and about 0.030 inches, and most preferably in the range between about 0.010 inches and about 0.020 inches. It should be noted that the sphere is not a semi-sphere, and thus a plane that passed through the sphere to form the spherical contact point 22, 23, 24 does not pass through its diameter.

It will be appreciated that the principles of the invention can be practiced with any desirable tool holder. For example, referring now to FIGS. 6-8, a tool holder may comprise a milling cutter, shown generally at 100, that incorporates the principles of the invention. The milling cutter 100 includes an associated set of cutting inserts 12 shown installed within milling cutter 100. The milling cutter 100 comprises a head portion 114 that is generally radially symmetrical about its rotational axis 116. The head portion 114 is preferably cylindrical and abuts an optional shank portion 115. The head portion 114 and the shank portion 115 share common rotational axis 116. The head portion 114 preferably, but not necessarily, includes a plurality of flutes 118 each bearing a plurality of insert receiving pockets 120 therein. The insert receiving pockets 120 are rotationally symmetrically arranged with respect to the axis 116. At least one, but possibly more, of the cutting inserts 112 are configured and dimensioned to be received within and secured to each pocket 120.

Figure 6:
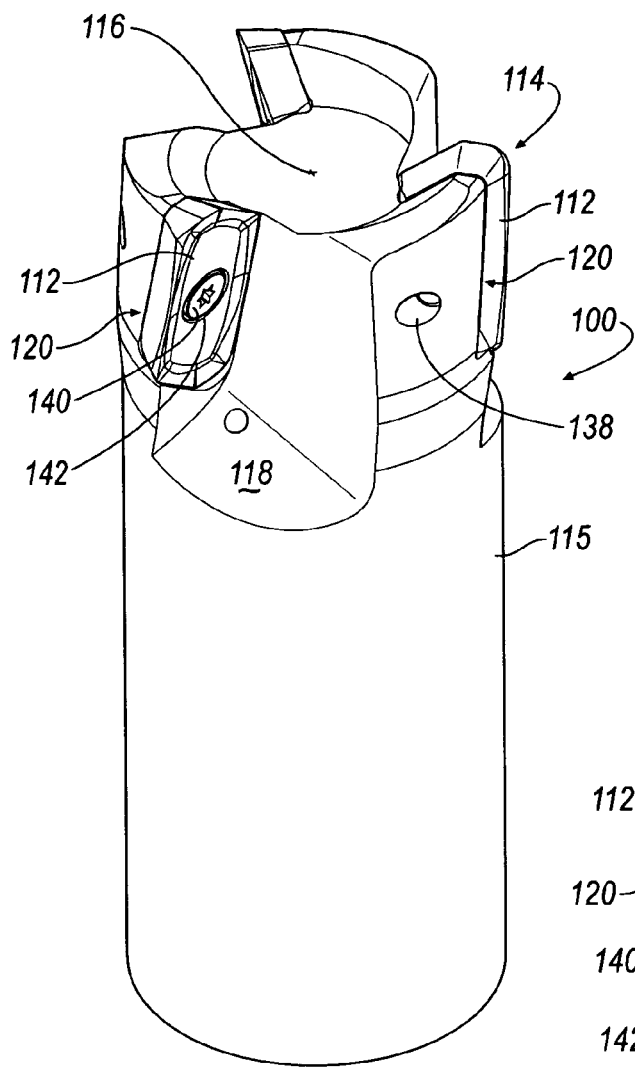
FIG. 6 is a perspective view of a milling cutter with spherical contact points according to an embodiment of the invention.
Figure 7:
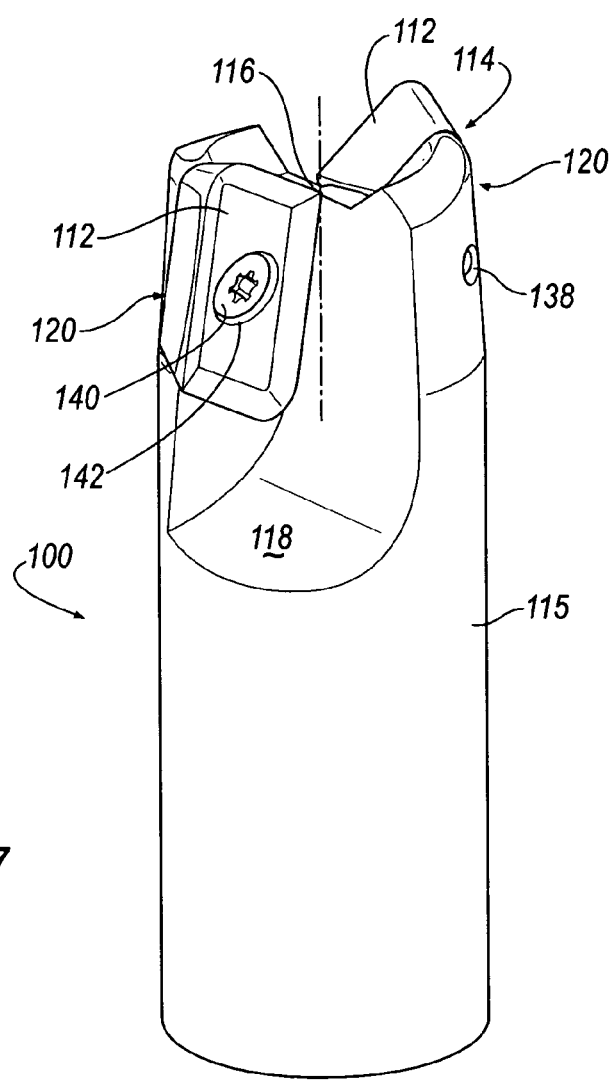
FIG. 7 is a perspective view of a different type of milling cutter with spherical contact points according to another embodiment of the invention.

In the illustrated embodiment of FIG. 6, three cutting inserts 112 are received within and secured to a corresponding pocket 120. However, it will be appreciated that the invention is not limited by the number of inserts 112 and pockets 120, and that the invention can be practiced with any desired number of inserts 112 and pockets 120. For example, the head portion 114 of the invention can be practiced with two inserts 112 and two pockets 120, as shown in FIG. 7. In another example, the head portion 114 of the cutting tool 100 can include four or more inserts 112 and pockets 120.

Figure 8:
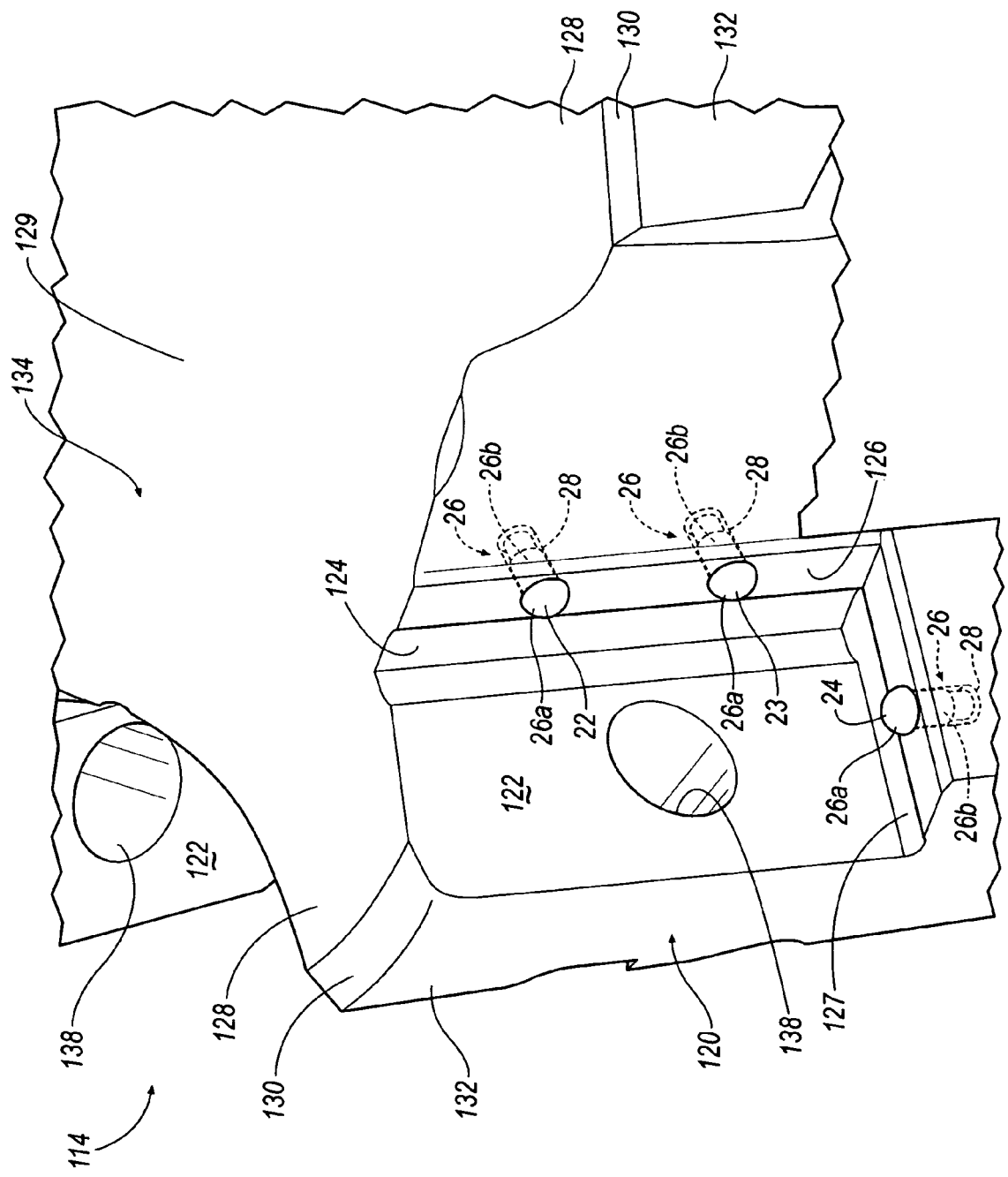
FIG. 8 is an enlarged partial perspective view of a cutter body of a milling cutter with spherical contact points and the cutting inserts removed for clarity according to an embodiment of the invention.

As shown in FIG. 8, each insert receiving pocket 120 has a pocket base wall or seat surface 122 that may be forwardly and downwardly slanted at an acute angle with respect to the axis 116. The seat surface 122 constitutes a tangential abutment surface of the insert receiving pocket 120. The pocket 120 also includes a support sidewall 126 that constitutes a radial abutment surface and a support sidewall 127 that constitutes an axial abutment surface for the sidewalls of the insert 112 when the insert 112 is mounted in the pocket 120, as shown in FIGS. 6 and 7. A stress relief groove 124 may be provided between the seat surface 122 and the radial support sidewall 126. In the illustrated embodiment, the stress relief groove 124 has a radius of approximately 0.047 inches (approximately 1.19 mm). However, the radius of the stress relief groove 124 varies, among other things, on the design of the cutting insert 112.

A threaded bore 138 extends through the center of the pocket base wall 122 and is substantially perpendicular thereto. In the assembled position of the cutting tool 100, each of the cutting inserts 112 is retained within an insert receiving pocket 120 by a clamping screw 140 that passes through a through bore 142 of the cutting insert 112 and threadingly engages the threaded bore 138 in the insert receiving pocket 120, as shown in FIGS. 1 and 2.

A top surface 134 of the head portion 114 may include a first portion 128 and a substantially planar second portion 129. The head portion 114 may also include a chamfered surface 130 that intersects the first portion 128 of the top surface 134, and a peripheral face 132 that intersects the pocket base wall 122 and the chamfered surface 130.

Referring now to FIG. 8, the tool holder 100 includes at least one, preferably two spherical contact points 22, 23 located on the radial support sidewall 126 of the tool holder 100. Similar to the tool holder 10, the spherical contact points 22, 23 may be formed is by a rivet-like structure, shown generally at 26, having a head portion 26a and a shaft portion 26b that is inserted into an opening or aperture 28 formed in and substantially perpendicular to the sidewall 126. The rivet-like structure 26 may be formed of a material having a hardness that is at least as hard as the material forming the insert pocket 16. For example, the rivet-like structure 26 may be formed of 4340 steel having a Rockwell hardness of 40 or greater. Other ways of providing the spherical contact points 22, 23 are contemplated by the inventors and are within the scope of the invention. For example, each spherical contact point 22, 23 may be integrally formed with the sidewall 126 of the tool holder 100.

As described above, the spherical contact points 22, 23, 24 of the tool holder minimize the contact area between the cutting insert and the support sidewalls of the pocket of the tool holder. As a result, the spherical contact points 22, 23, 24 minimize the effects of surface distortion of the cutting insert to ensure that the cutting insert is properly located in the pocket of the tool holder.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A tool holder, comprising:
   a head portion including an insert pocket defined by a seat surface and at least one support sidewall; and
   at least one spherical contact point protruding from said at least one support sidewall,
   wherein the at least one spherical contact point minimizes a contact area between a cutting insert mounted in the insert pocket and the at least one support sidewall of the insert pocket, and
   wherein the spherical contact point comprises a rivet-like structure including a head portion and a shaft portion, wherein the shaft portion is disposed within an aperture formed in the at least one support sidewall.

2. The tool holder according to claim 1, wherein the head portion has a height in a range between about 0.001 inches and about 0.050 inches.

3. The tool holder according to claim 2, wherein the head portion has a height in a range between about 0.005 inches and about 0.036 inches.

4. The tool holder according to claim 3, wherein the head portion has a height in a range between about 0.010 inches and about 0.020 inches.

5. The tool holder according to claim 1, wherein the outer surface of the spherical contact point comprises one of a sphere, a spheroid, an oblate spheroid, a prolate spheroid, and a pseudosphere.

6. The tool holder according to claim 1, wherein the spherical contact point is integrally formed with the at least one support sidewall.

7. The tool holder according to claim 1, further comprising a plurality of support sidewalls, and wherein each support sidewall includes at least one spherical contact point.

8. The tool holder according to claim 7, wherein one of the plurality of support sidewalls comprises a radial support sidewall including at least two spherical contact points.

9. The tool holder according to claim 7, wherein one of the plurality of support sidewalls comprises an axial support sidewall including at least one spherical contact point.

10. A tool holder, comprising:
    a head portion including an insert pocket defined by a seat surface, a radial support sidewall and an axial support sidewall;
    a first spherical contact point protruding from said radial support sidewall; and
    a second spherical contact point protruding from said axial support sidewall,
    wherein the first and second spherical contact points minimize a contact area between a cutting insert mounted in the insert pocket and the radial and axial support sidewalls of the insert pocket wherein at least one of the spherical contact points comprises a rivet-like structure including a head portion and a shaft portion, wherein the shaft portion is disposed within an aperture formed in one of the radial and axial support sidewalls.

11. The tool holder according to claim 10, wherein the head portion has a height in a range between about 0.001 inches and about 0.050 inches.

12. The tool holder according to claim 11, wherein the head portion has a height in a range between about 0.005 inches and about 0.030 inches.

13. The tool holder according to claim 12, wherein the head portion has a height in a range between about 0.010 inches and about 0.020 inches.

14. The tool holder according to claim 10, wherein the outer surface of at least one of the spherical contact points comprises one of a sphere, a spheroid, an oblate spheroid, a prolate spheroid, and a pseudosphere.

15. The tool holder according to claim 10, wherein at least one of the spherical contact points is integrally formed with one of the radial and axial support sidewalls.

* * * * *